March 3, 1936.  R. H. DART  2,032,688
BLIGHT CUTTING SHEARS
Filed Oct. 15, 1934
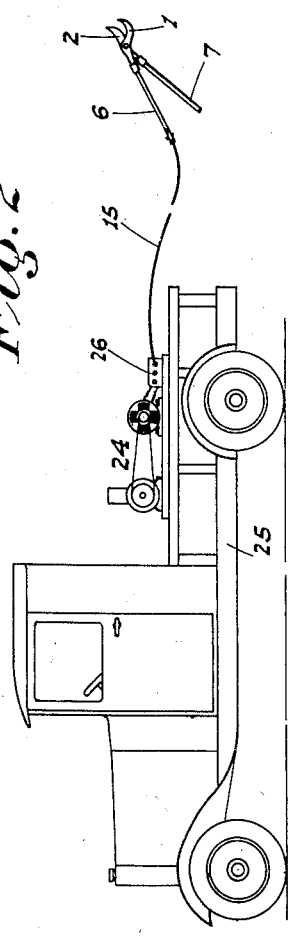
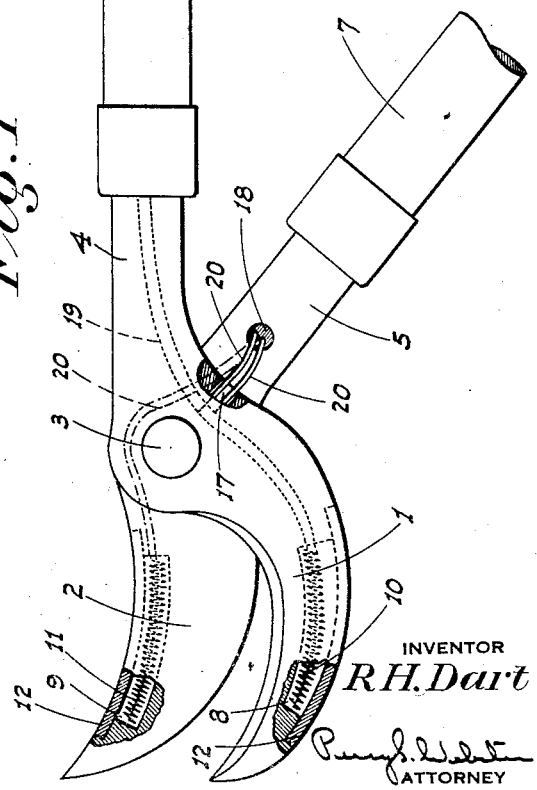
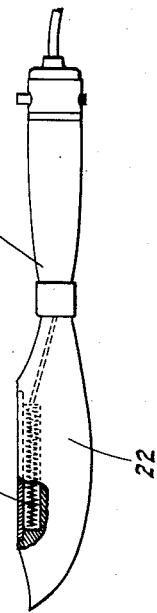
INVENTOR
R. H. Dart
ATTORNEY Patented Mar. 3, 1936

2,032,688

UNITED STATES PATENT OFFICE 2,032,688

BLIGHT CUTTING SHEARS

Robert H. Dart, Sacramento, Calif.

Application October 15, 1934, Serial No. 748,317

3 Claims. (Cl. 219—21)

This invention relates to the treatment of tree diseases and particularly to what is commonly known as pear blight. This blight or disease is caused by a species of bacteria working in the bark of the tree, and sometimes spreads with considerable rapidity; the most vigorous trees with much succulent growth being unfortunately the most susceptible to the disease.

The control of the disease now consists mainly in cutting off the diseased parts as fast as they appear, the pruning tools used as well as the cut ends or wounds being disinfected after each cut. This is a slow and laborious procedure since it requires that the ends be painted with a disinfectant while the shears must be dipped in a bucket of disinfectant. As a result of this slow process the disease very often gets ahead of the control operations, unless a very large crew is working simultaneously, which not only entails a heavy expense, but necessitates the use of skilled men who are not always available.

Experiments lately conducted in the agricultural department of a certain university have shown that the disease can be controlled by the use of heat, an acetylene torch having been used in these experiments as the heat producing medium, and acting to both kill the bacteria and cauterize the wound. This method however is unsatisfactory from a practical standpoint, as a torch of this character is naturally hard to control when working among the limbs of a tree, is apt to burn the healthy as well as the diseased wood and is also liable to be a source of danger to the operator himself.

It is therefore the principal object of my invention to provide a practical means for applying a bacteria killing and wound cauterizing heat to the diseased parts simultaneous with the cutting of such parts from the tree so that the complete operation is performed in a rapid and efficient manner.

The above and other objects I accomplish by means of such structure and relative arrangement of parts as will fully appear by a perusal of the following specification and claims.

In the drawing similar characters of reference indicate corresponding parts in the several views:

Figure 1 is a side view of a pair of pruning shears, partly broken out and showing the blades equipped with the heat creating means.

Figure 2 is a side outline of a motor truck equipped with a generating unit for supplying the electricity to the shears heater.

Figure 3 is a side elevation of a pruning knife showing the heating means applied thereto.

Referring now more particularly to the characters of reference on the drawing, the numerals 1 and 2 denote the blades of a pair of pruning shears, which blades are pivoted together as at 3 and having shanks 4 and 5 connected to handles 6 and 7 respectively. The arrangement and general shape of these parts is conventional but the blades would preferably be made somewhat thicker at the back than is ordinarily the case.

This extra thickness enables me to form longitudinally extending chambers 8 and 9 in the back of the blades 1 and 2 respectively, for the reception of electric resistance or heater elements 10 and 11 respectively. These elements are of any suitable character and as is the case with electric heating appliances generally are of course insulated from the blades themselves. The chambers are covered along the back of the blades by removable plates 12 so that not only are the heater elements protected but they can be installed or easily removed for replacement whenever necessary.

A combination snap switch and socket unit 13 of any suitable and conventional type is mounted at the outer end of the handle 6, said socket being adapted for detachable engagement with the male element 14 of a standard plug, to which an extension cord 15 is connected in the ordinary manner. From the switch to the chamber 8 the handle 6, the shank 4, and the blade 1 are drilled to provide a wire passage 16 which has an outlet 17 from the outer back edge of the shank 4 where the latter overlaps the shank 5.

The blade 2 and the shank 5 are also provided with a wire passage leading from the chamber 9 to an outlet 18 in the inner face of the shank 5 beyond the plane of overlap of the shank 4 therewith. Wires 19 lead through the passage 16 from the switch 13 to the terminals of the resistance element 10. Other wires 20 lead from the terminals of the element 11 and project through the outlet 18 and into the opening 17 and the passage 16, where they connect to the wires 19. In this manner the elements are wired in parallel and the circuit to both elements is closed or open simultaneously by the actuation of the one switch, and due to the relative position of the wire outlets 17 and 18, the swivel movement of the blades and shanks relative to each other does not interfere with the exposed portions of the wires which of course are flexible. Since such exposed portions of the wires are back of the thick shank 4 they are prevented from damaging contact with the part of the tree being cut.

The resistances are designed so as to generate and hold a heat sufficient to heat the blades so as to kill any bacteria with which they come in contact and also in effect cauterize the wounds as made by the blades and prevent bleeding thereof, but insufficient to kill the temper of the blades.

The same heating means may be provided in a pruning knife 21 having a relatively thick backed blade 22, the resistance element 23 being mounted along and inside the blade at the back in the same manner as described in connection with the shears.

To provide current for the shears or other pruning tools I preferably provide a portable current generating unit 24 which is mounted on a motor truck 25. The current is carried in a multiple outlet box 26 mounted on the truck so that a number of extension cords 15 and a corresponding number of tools may be connected up and used simultaneously.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A pruning shears comprising a pair of cooperating blades pivoted together, overlapping shanks projecting from the blades, handles projecting from the shanks, electric resistance elements mounted in the blades, a passage extending from one element through the shank and handle of the corresponding blade, wires connected to said element and extending through the passage to the outer end thereof for connection to a source of current, there being an outlet from the passage on the back edge of the corresponding shank, another passage from the element of the other blade leading to an exposed outlet in the inner face of the corresponding shank, and wires connected to said last named element and extending through the last named passage and outlet and thence into the first named outlet and passage and being there connected to the first named wires.

2. Tree pruning shears comprising a pair of cooperating blades each having a longitudinal chamber formed therein, an electric resistance element in each chamber, a current conducting wire extending into one blade and connected with the element therein, a wire connected with the first wire and extending out of the corresponding blade and into the adjacent blade and being connected with the element in the latter blade, such latter wire being flexible to allow of the free cooperating movement of the blades.

3. The combination of a transporting vehicle, a current generator carried on the vehicle, a pair of pruning shears, a heating element within the shears, and a current carrying wire connecting the generator with the element whereby such element may be energized as the shears are used.

ROBERT H. DART.